(12) United States Patent
Hsu et al.

(10) Patent No.: US 8,184,232 B2
(45) Date of Patent: May 22, 2012

(54) FLAT PANEL DISPLAY AND METHOD FOR FABRICATING THE SAME

(75) Inventors: Tun-Hao Hsu, Hsin-Chu (TW);
Hong-Jye Hong, Hsin-Chu (TW);
Chih-Kang Wu, Hsin-Chu (TW);
Sheng-Chieh Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 214 days.

(21) Appl. No.: 12/479,988

(22) Filed: Jun. 8, 2009

(65) Prior Publication Data

US 2010/0097539 A1    Apr. 22, 2010

(30) Foreign Application Priority Data

Oct. 17, 2008    (TW) ................................ 97139995 A

(51) Int. Cl.
*G02F 1/1333*    (2006.01)
(52) U.S. Cl. .......................... 349/58; 29/592.1; 361/692
(58) Field of Classification Search .................... 349/58;
361/679–681, 683–686; 384/843, 836; 403/282;
29/592.1
See application file for complete search history.

(56) References Cited

U.S. PATENT DOCUMENTS

| | | | |
|---|---|---|---|
| 4,415,983 A * | 11/1983 | Lachmann et al. | 361/679.26 |
| 5,202,677 A * | 4/1993 | Parker et al. | 349/21 |
| 5,479,285 A * | 12/1995 | Burke | 349/58 |
| 5,808,707 A * | 9/1998 | Niibori et al. | 349/60 |
| 6,256,075 B1 | 7/2001 | Yang | |
| 6,914,773 B2 | 7/2005 | Yang et al. | |
| 7,327,430 B2 * | 2/2008 | Lee et al. | 349/150 |
| 7,684,212 B2 * | 3/2010 | Lowles et al. | 361/807 |
| 2004/0036818 A1 * | 2/2004 | Kim et al. | 349/58 |
| 2005/0105012 A1 * | 5/2005 | Kim et al. | 349/58 |
| 2006/0285030 A1 * | 12/2006 | Kim | 349/58 |
| 2007/0019275 A1 * | 1/2007 | Okuda | 359/265 |
| 2007/0091223 A1 * | 4/2007 | Maruta et al. | 349/58 |
| 2008/0055828 A1 * | 3/2008 | Yang | 361/680 |
| 2008/0165496 A1 * | 7/2008 | Kang et al. | 361/692 |

FOREIGN PATENT DOCUMENTS

| | | |
|---|---|---|
| CN | 2682441 | 3/2005 |
| CN | 101060598 | * 10/2007 |

OTHER PUBLICATIONS

English language translation of abstract of CN 101060598 (published Oct. 24, 2007).
English language translation of abstract of CN 2682441 (published Mar. 2, 2005).

* cited by examiner

*Primary Examiner* — Edward Glick
*Assistant Examiner* — Sang Nguyen
(74) *Attorney, Agent, or Firm* — Thomas, Kayden, Horstemeyer & Risley, LLP

(57) ABSTRACT

In the specification and drawing a flat panel display with a front cover, a rear cover, a printed circuit board and a display module is disclosed. The rear cover is fixed on the front cover, wherein the rear cover has a printed circuit board region and a panel region. The printed circuit board is locked on the rear cover and corresponding to the printed circuit board region. The display module is fixed on the front cover and corresponding to the panel region, wherein the display module comprise an liquid crystal panel facing the front cover and a back plate facing the rear cover. Moreover, a method for fabricating the flat panel display is also disclosed in the specification and drawing.

29 Claims, 9 Drawing Sheets

FLAT PANEL DISPLAY AND METHOD FOR FABRICATING THE SAME

RELATED APPLICATIONS

This application claims priority to Taiwan Application Serial Number 97139995, filed Oct. 17, 2008, which is herein incorporated by reference.

BACKGROUND

1. Field of Invention

The present invention relates to a structure or arrangement of a display. More particularly, the present invention relates to a structure or arrangement of a flat panel display.

2. Description of Related Art

With the fast development of the digital information and multimedia applications, as well as display manufacturers developing the markets, the application of displays has become more popular. For example, flat panel displays are commonly used devices in homes and offices. People look forward to high-quality displays. In contrast with the traditional cathode ray tube display (CRT), the flat panel display has advantages including thin thickness, smaller volume, lightweight and so forth.

Some materials may be reduced to lose weight of the flat panel display. However, other materials having certain functions are difficult to be canceled, resulting in a bottleneck.

For fabricating the traditional flat panel display, the back plate of the display module is used for fixing one or more system boards, and then the rear cover is locked. However, the back plate of the display module should be reduced to lose weight; for example, hook slips or lock holes of the back plate are canceled to result in no place of the back plate fixing the system boards.

In view of above, there is a need in the related field to provide a novel flat panel display and a method for fabricating the same.

SUMMARY

The following presents a simplified summary of the invention in order to provide a basic understanding to the reader. This summary is not an extensive overview of the invention and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a flat panel display.

In accordance with an embodiment of the present invention, the flat panel display comprises a front cover, a rear cover, a printed circuit board and a display module. The rear cover is fixed on the front cover, wherein the rear cover has a printed circuit board region and a panel region. The printed circuit board is locked on the rear cover and corresponding to the printed circuit board region. The display module is fixed on the front cover and corresponding to the panel region, wherein the display module comprises a liquid crystal panel facing the front cover and a back plate facing the rear cover.

Accordingly, the display module and the printed circuit board are disposed at different regions for thin thickness and smaller volume.

In accordance with another embodiment of the present invention, the panel display comprises a front cover, a rear cover, a supporter, a display module and a printed circuit board. The front cover has a window. The rear cover is fixed on the front cover, wherein the rear cover has a panel region corresponding to the window and a printed circuit board region adjacent to the panel region. The display module is disposed between the front cover and the rear cover, wherein the display module is comprised of a liquid crystal panel facing the window and a back plate facing the panel region. The supporter has a plurality of ends, wherein the supporter is fastened on the back plate by means of the ends. One of the printed circuit boards is locked on the back plate, and the other printed circuit boards are locked on the rear cover and correspond to the printed circuit board region.

Accordingly, only one printed circuit board is locked on the back plate; the other printed circuit boards and the display module are non-overlapping. Moreover, the supporter is fastened on the back plate to reduce cost and electric leakage of lamps and facilitating manufacture. Thus, the panel display has thin thickness and smaller volume.

In accordance with another embodiment of the present invention, the panel display comprises a front cover, a rear cover, a printed circuit board and a display module. The rear cover is comprised of a main body and a removable plate, wherein the main body and the removable plate are joined together, the main body having an opening corresponding to the removable plate. The display module is disposed between the front cover and the main body. The printed circuit board is locked on the removable plate and facing the back plate.

Accordingly, the printed circuit board is fixed on the removable plate beforehand to facilitate fabrication for increasing production capacity.

In another aspect, the present invention is directed to a method for fabricating the flat panel display.

In accordance with another embodiment of the present invention, the method for fabricating the flat panel display comprises the following steps. A printed circuit board is locked on a removable plate; a display module and a front cover are joined; the front cover and a main body of a rear cover are joined; the removable plate and the main body of the rear cover are assembled.

Accordingly, the printed circuit board is fixed on the removable plate beforehand to facilitate fabrication for increasing production capacity.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Like reference numerals are used to designate like parts in the accompanying drawings.

DESCRIPTION OF THE PREFERRED EMBODIMENTS

Figure 1A:
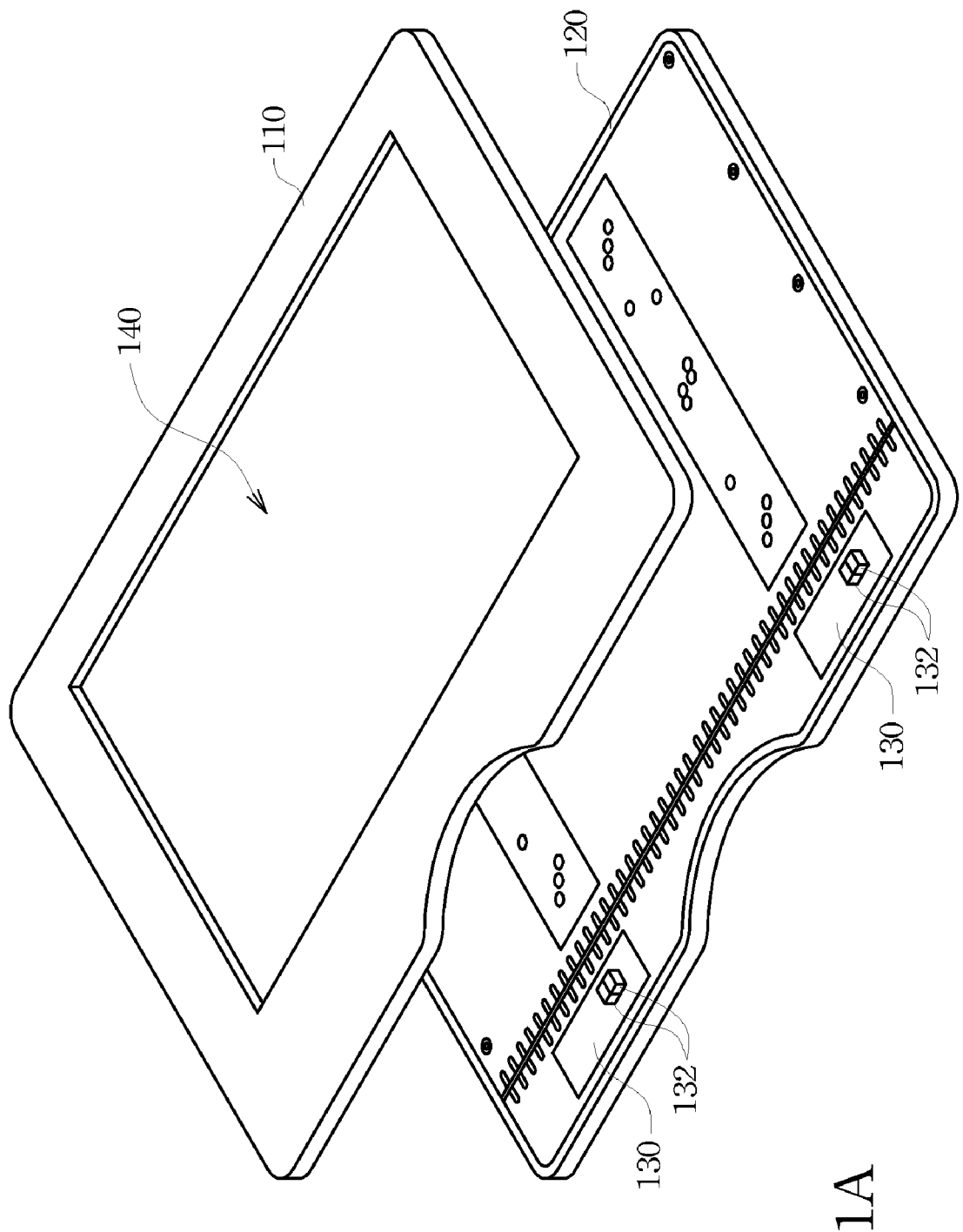
FIG. 1A is an explosion diagram of a panel display according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In one or more aspects, the present invention is directed to a panel display. The panel display may be a large size panel display and may be applicable or readily adaptable to all technologies. Herewith the panel display may is illustrated by reference to the following description considered in FIG. 1A, FIG. 1B, FIG. 2, FIG. 3A, FIG. 3B, FIG. 3C and FIG. 4.

Please refer to FIG. 1A. FIG. 1A is an explosion diagram of a flat panel display 100 according to an embodiment of the present invention. In FIG. 1A, the flat panel display 100 comprises a front cover 110, a rear cover 120, a printed circuit board 130 and a display module 140. The rear cover 120 is fixed on the front cover 110. The printed circuit boards 130 are locked on the rear cover 120. The display module 140 is fixed on the front cover 110 and is disposed between the front cover 110 and the rear cover 120. Accordingly, the printed circuit boards 130 are fixed on the rear cover 120 beforehand to facilitate fabrication for increasing production capacity.

The printed circuit board 130 comprises one or more electronic components 132. The electronic components 132 face the back side or the inner side of the front cover 110 where the display module 140 is disposed.

In practice, the printed circuit board 130 may be a system board for providing or controlling audio signal, video signal, electric power and so forth. For example, the electronic component 132 of the printed circuit board 130 is a power converter; the power converter, electrically connected to the display module 140, is capable of transforming alternating current into direct current for the display module 140.

Figure 1B:
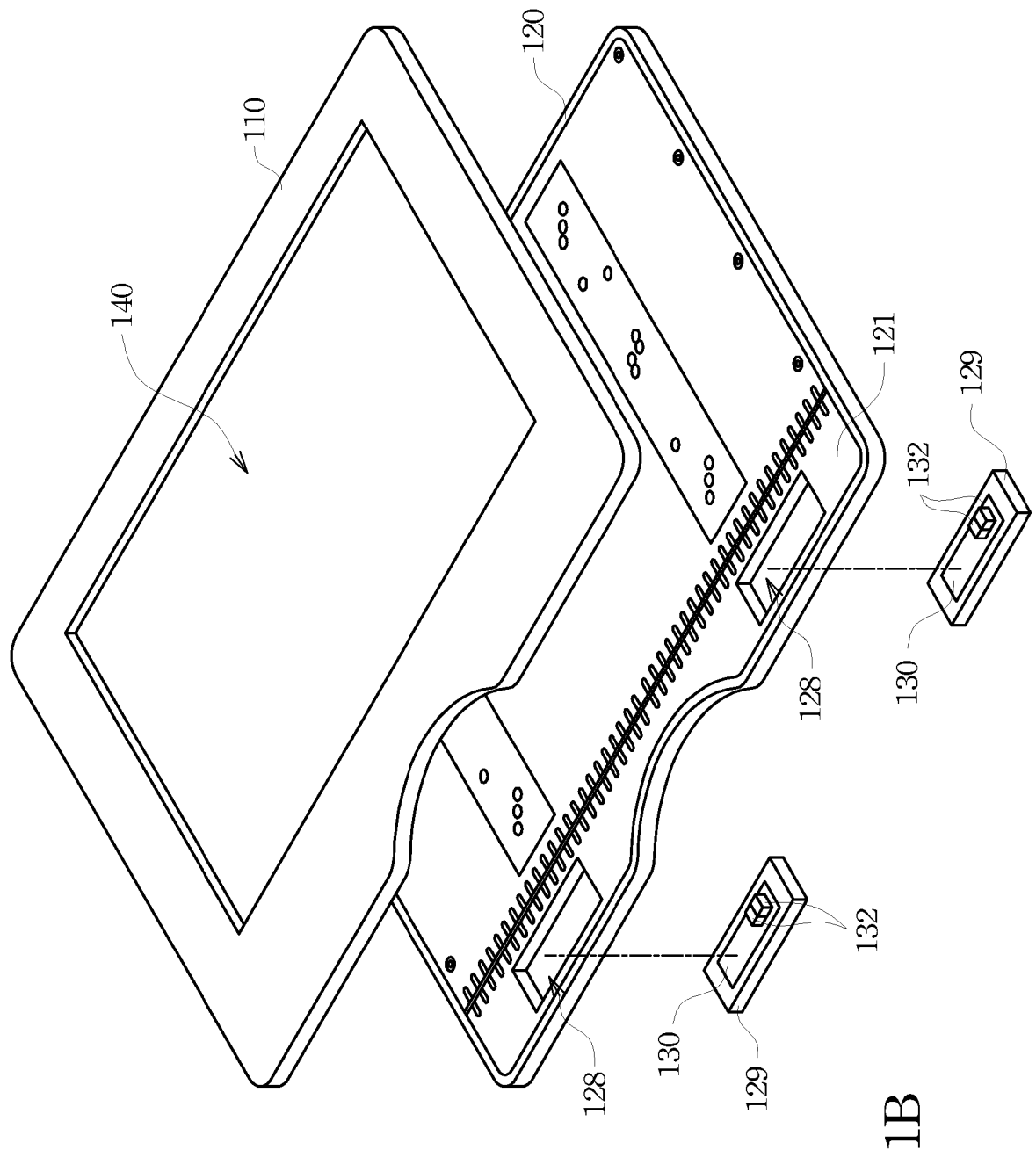
FIG. 1B is an explosion diagram of a panel display according to another embodiment of the present invention.

Please refer to FIG. 1B. FIG. 1B is an explosion diagram of a flat panel display 100 according to another embodiment of the present invention. In FIG. 1B, the flat panel display 100 comprises a front cover 110, a rear cover 120, a printed circuit board 130 and a display module 140. The rear cover 120 is fixed on the front cover 110. The printed circuit boards 130 are locked on the rear cover 120. The display module 140 is fixed on the front cover 110 and is disposed between the front cover 110 and the rear cover 120.

It should be noted that the rear cover 120 is comprised of a main body 121 and a removable plate 129, wherein the main body 121 having an opening 128 corresponding to the removable plate 129. The edge of the removable plate 129 and the edge of the opening 128 are joined with each other. The printed circuit board 130 is locked on the removable plate 129. In this embodiment, the outer side surface of the main body 121 and the outer side surface of the removable plate 129 are matched. Therefore, it is a little difficult to identify the joined boundary between the removable plate 129 and the opening 128 when viewing at the back side or the outer side of the rear cover 120.

Accordingly, the printed circuit board 130 is fixed on the removable plate 129 beforehand, and then the removable plate 129 and the opening 128 are joined with each other, so as to facilitate fabrication for increasing production capacity.

Figure 2:
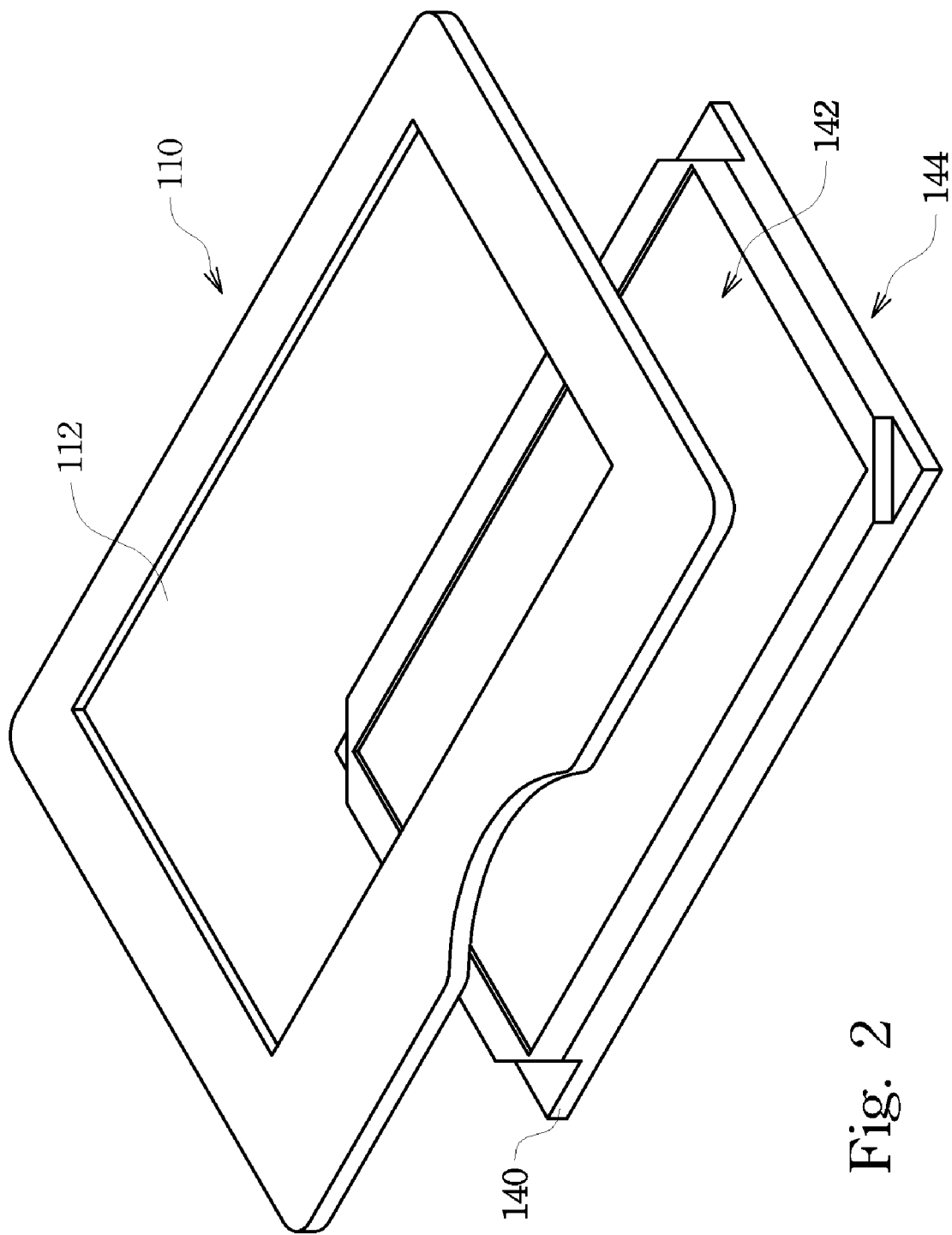
FIG. 2 is a partial explosion diagram of a panel display according to another embodiment of the present invention.

For a more complete understanding of the front cover 110 and the display module 140, please refer to FIG. 2. FIG. 2 is a partial explosion diagram of a flat panel display 100 according to another embodiment of the present invention. In FIG. 2, the front cover 110 has a window 112, and the display module 140 comprises a liquid crystal panel 142 and a back plate 144. The liquid crystal panel 142 is located at the front side or the outer side of the display module 140, and the display face of the liquid crystal panel 142 faces the back side of the front cover 110; in other words, the display face of the liquid crystal panel 142 corresponds to the window 112. The back plate 144 is located at the backside of the display module 140 and faces the rear cover 120.

The window 112 is positioned to show the liquid crystal panel 142. In practice, one or more users can watch frames or images displayed in the liquid crystal panel 142 from the window 112.

Figure 3A:
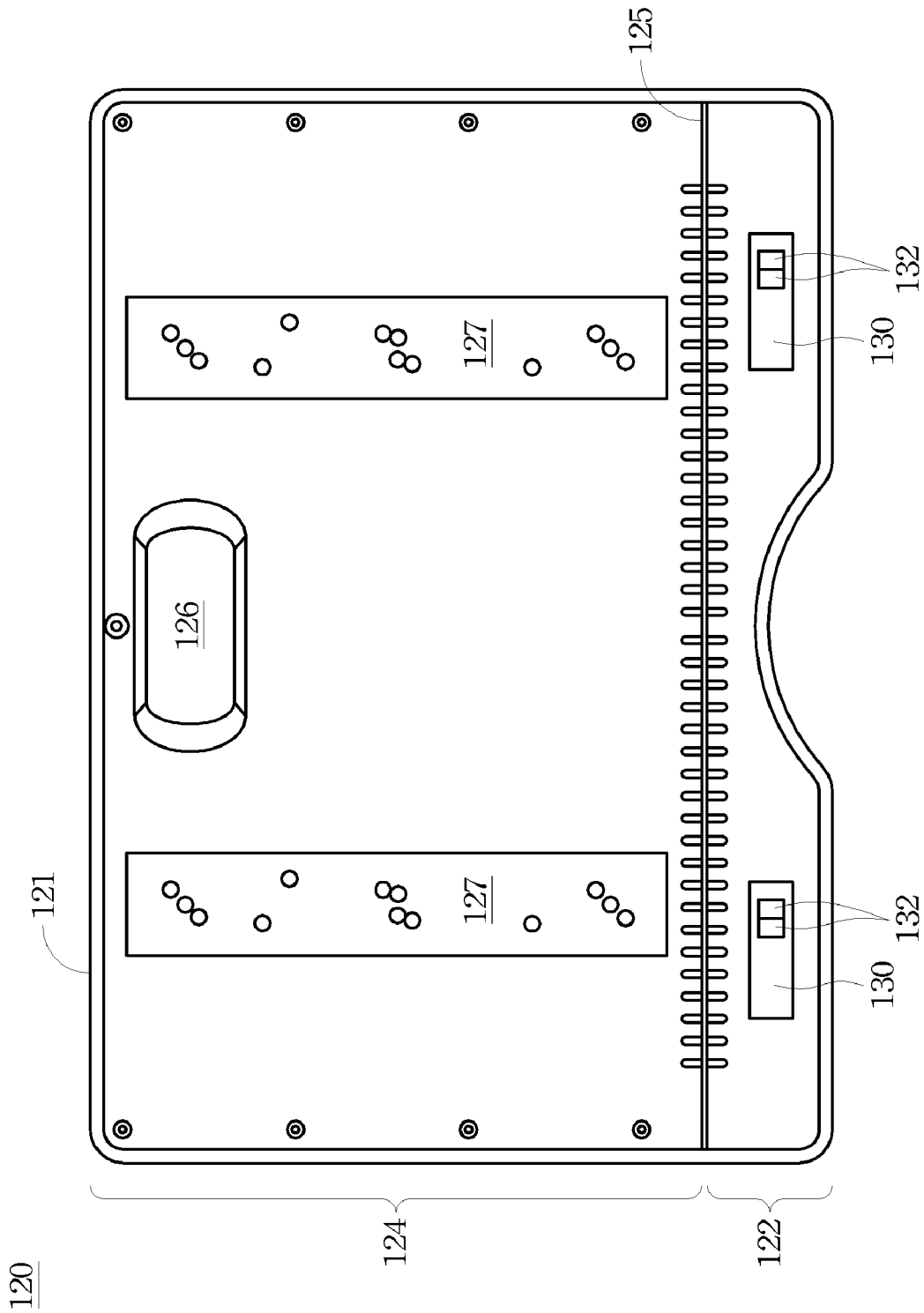
FIG. 3A is a vertical view of the rear cover of FIG. 1A.

Please refer to FIG. 3A. FIG. 3A is a vertical view of the front side or the inner side of the rear cover 120 of FIG. 1A. In FIG. 3A, the rear cover 120 comprises a printed circuit board region 122 and a panel region 124. The printed circuit board region 122 and the panel region 124 are divided by means of a septum 125; the septum 125 is disposed between the printed circuit board region 122 and the panel region 124. The printed circuit board region 122 is adjacent to the panel region 124, and the panel region 124 and the printed circuit board region 122 are non-overlapping.

In FIG. 3A, the printed circuit board 130 is disposed in the printed circuit board region 122. The display module 140 is disposed corresponding to the panel region 124; in other words, the back plate 144 faces the panel region 124.

Accordingly, the display module 140 and the printed circuit board 130 are non-overlapping as a result of the printed circuit board 130 disposed in the printed circuit board region 122 and the display module 140 disposed corresponding to the panel region 124. Thus, the flat panel display 100 has thin thickness and smaller volume.

In FIG. 3A, the rear cover 120 comprises a concave 126. The concave 126 is disposed in the panel region 124. In the preferred embodiment, the concave 126 is disposed at midline of the panel region 124. The concave 126 can contain a circuit board, such as a controlling circuit board 146 shown in FIG. 4, thereby reducing the thickness of the flat panel display 100.

In FIG. 3A, the rear cover 120 comprises one or more notches 127. The notches 127 are disposed in the panel region 124. In the preferred embodiment, the notches 127 are disposed at two opposing sides of the concave 126 in the panel region 124. The notches 127 can contain supporters, such as supporters 150 shown in FIG. 4, thereby reducing the thickness of the flat panel display 100.

Figure 3B:
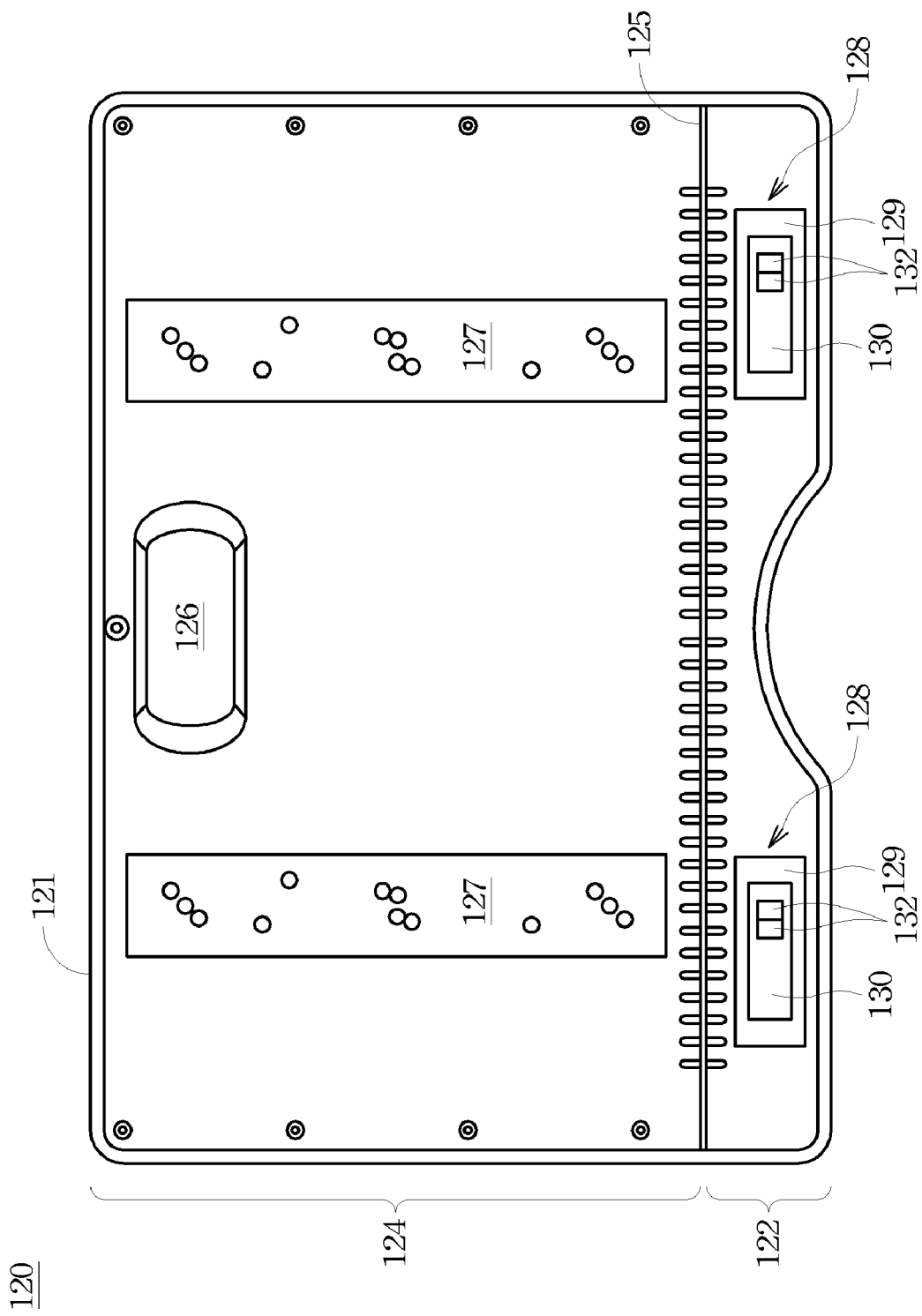
FIG. 3B is a vertical view of the rear cover of FIG. 1B.

Please refer to FIG. 3B. FIG. 3B is a vertical view of the front side or the inner side of the rear cover 120 of FIG. 1B. In FIG. 3B, the rear cover 120 comprises a printed circuit board region 122 and a panel region 124. The printed circuit board region 122 and the panel region 124 are divided by means of a septum 125; the septum 125 is disposed between the printed circuit board region 122 and the panel region 124. The printed circuit board region 122 is adjacent to the panel region 124, and the panel region 124 and the printed circuit board region 122 are non-overlapping.

In FIG. 3B, the printed circuit board 130 is disposed in the printed circuit board region 122. The display module 140 is disposed corresponding to the panel region 124; in other words, the back plate 144 faces the panel region 124.

Accordingly, the display module 140 and the printed circuit board 130 are non-overlapping as a result of the printed circuit board 130 disposed in the printed circuit board region 122 and the display module 140 disposed corresponding to the panel region 124. Thus, the flat panel display 100 has thin thickness and smaller volume.

In FIG. 3B, the rear cover 120 comprises a concave 126. The concave 126 is disposed in the panel region 124. In the preferred embodiment, the concave 126 is disposed at midline of the panel region 124. The concave 126 can contain a circuit board, such as a controlling circuit board 146 shown in FIG. 4, thereby reducing the thickness of the flat panel display 100.

In FIG. 3B, the rear cover 120 comprises one or more notches 127. The notches 127 are disposed in the panel region 124. In the preferred embodiment, the notches 127 are disposed at two opposing sides of the concave 126 in the panel region 124. The notches 127 can contain supporters, such as supporters 150 shown in FIG. 4, thereby reducing the thickness of the flat panel display 100.

Figure 3C:
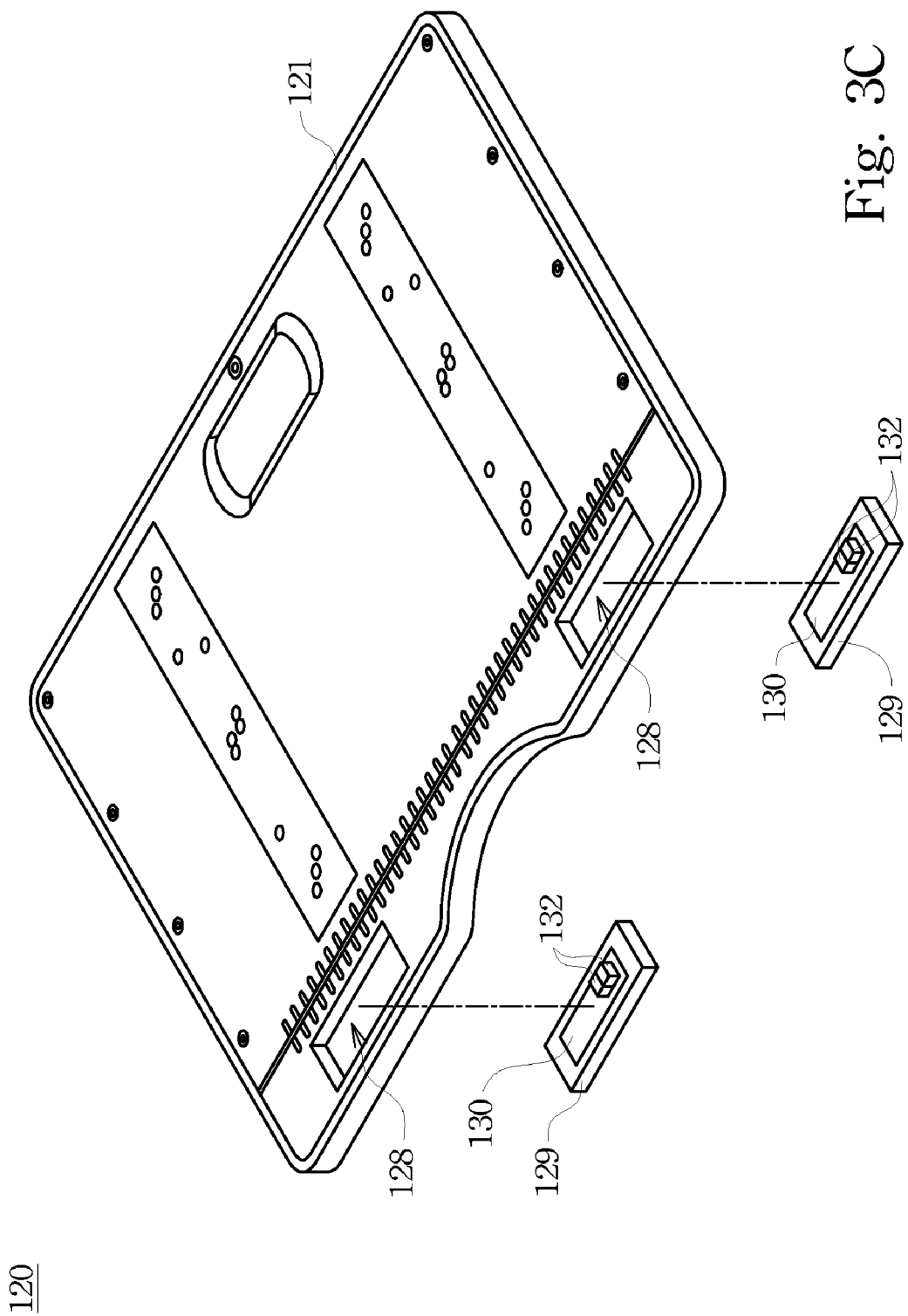
FIG. 3C is a partial explosion diagram of the rear cover of FIG. 3B.

Please refer to FIG. 3B and FIG. 3C. FIG. 3C is a partial explosion diagram of the rear cover 120 of FIG. 3B. The rear cover 120 is comprised of the main body 121 and the removable plate 129. The main body 121 has the opening 128 corresponding to the removable plate 129. The opening 128 is located in the printed circuit board region 122. The removable plate 129 corresponds to the opening 128, wherein the edge of the removable plate 129 and the edge of the opening 128 are joined with each other. The printed circuit board 130 is locked on the removable plate 129.

Accordingly, the printed circuit board 130 is fixed on the removable plate beforehand, and then the removable plate 129 and the opening 128 are joined with each other, so as to facilitate fabrication for increasing production capacity.

Figure 4:
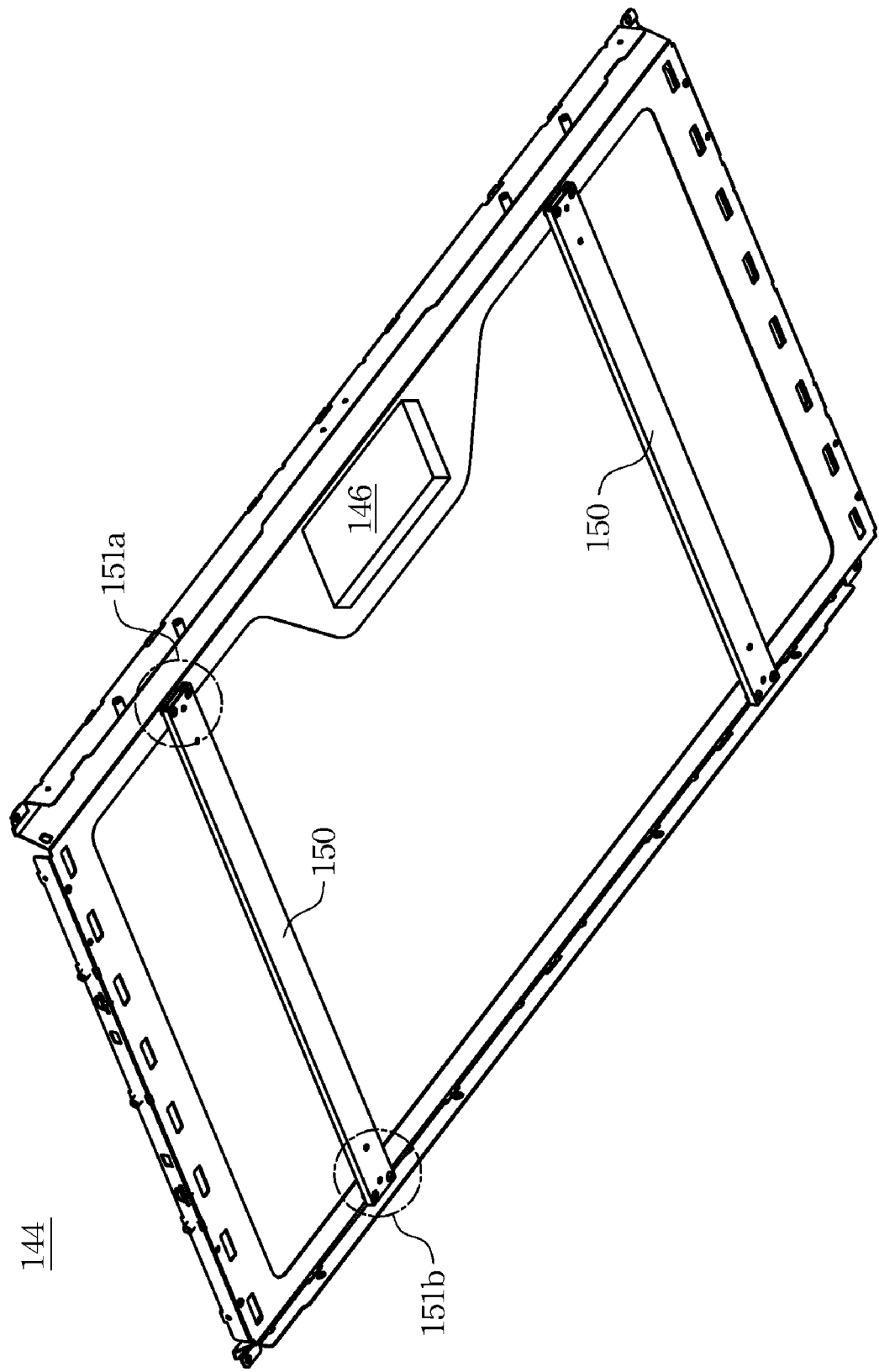
FIG. 4 is a pictorial drawing of the back plate of FIG. 2.

Please refer to FIG. 4. FIG. 4 is a pictorial drawing of the back plate 144 of FIG. 2. The controlling circuit board 146 locked on the back plate 144 is contained in the concave 126 of the rear cover 120 as shown in FIG. 3A or FIG. 3B and faces the front side or the inner side of the rear cover 120. The controlling circuit board 146 simply controls the display module 140 for rotating the liquid crystal molecules and showing the images presented without providing or controlling audio signal, video signal, electric power and so forth. On the other hand, the other printed circuit boards 130 is used for providing or controlling audio signal, video signal, and so forth, especially electric power. Because the controlling circuit board 146 and the other printed circuit boards 130 will interfere with each other, and the controlling circuit board 146 and the other printed circuit boards 130 can not be integrated into one printed circuit board. Therefore, the controlling circuit board 146 is disposed on the back plate 144, whereby the way or the distance of transmitting LCD control signal to the liquid crystal panel 142 is reduced or shortened, which is different from the power signal of the other printed circuit boards 130 transmitted to an backlight module of LCD, so as to facilitate control of the liquid crystal panel 142. In the other embodiment, the controlling circuit board 146 and the other printed circuit boards 130 can be both disposed but still separated in the panel region 124, if the space of the panel region 124 is allowed.

Of the printed circuit boards, only the one controlling circuit board 146 is locked on the back side of the back plate 144 and corresponds to the panel region 124; the other printed circuit boards 130 as shown in FIG. 1 are all locked on the rear cover 120 and correspond to the printed circuit board region 122. In other words, only one of the printed circuit boards is a controlling circuit board 146, and the other printed circuit boards 130 are system boards or the like that are not capable of controlling the liquid crystal panel 142.

In FIG. 4, the display module 140 comprises one or more supporters 150. The supporters 150 are disposed on the back side of the back plate 144 and face the front side or the inner side of the rear cover 120 as shown in FIG. 3A or FIG. 3B. Each of the supporters 150 has ends 151a, 151b. The supporters 150 are fastened on the back side of the back plate 144 by means of the ends 151a, 151b. The support 150, the printed circuit board 130 and the controlling circuit board 146 are non-overlapping. Thus, the flat panel display 100 has thin thickness and smaller volume.

The support 150 may have an open or hollow structure, so as to reduce weight of the back plate 144 or thereof; alternatively, the support 150 has a closed cross section 153 with the hollow structure or a solid cross section without the open or hollow structure, so as to increase the rigidity of the back plate.

In one or more aspects, the present invention is directed to a method for fabricating or assembling a flat panel display. The method may be used for fabricating a large size panel display and may be applicable or readily adaptable to all technologies. Herewith the method for fabricating the flat panel display is illustrated by reference to the following description considered in FIG. 5.

Figure 5:
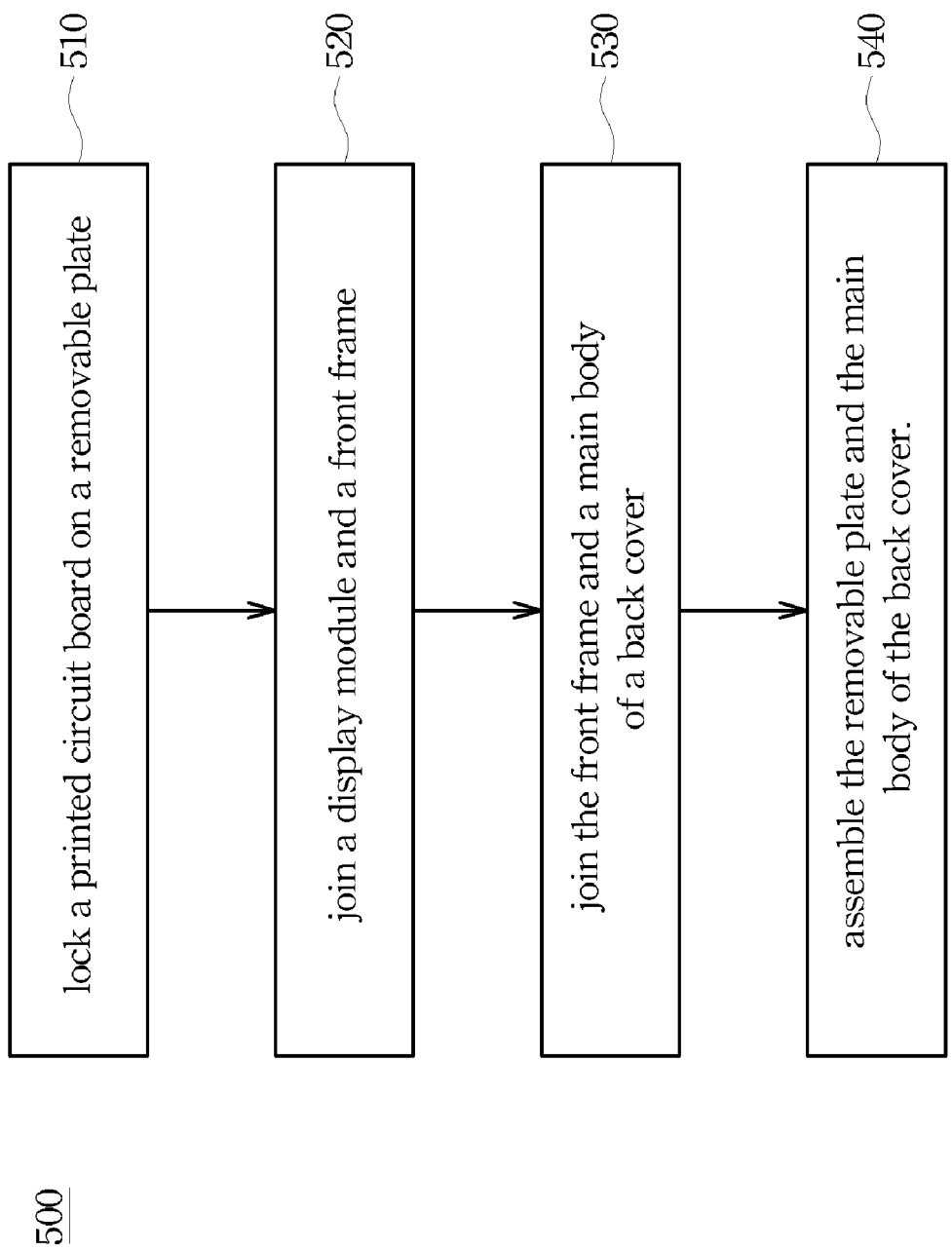
FIG. 5 shows a flow chart of a method 500 for fabricating a flat panel display according to another embodiment of the present invention.
Figure 6:
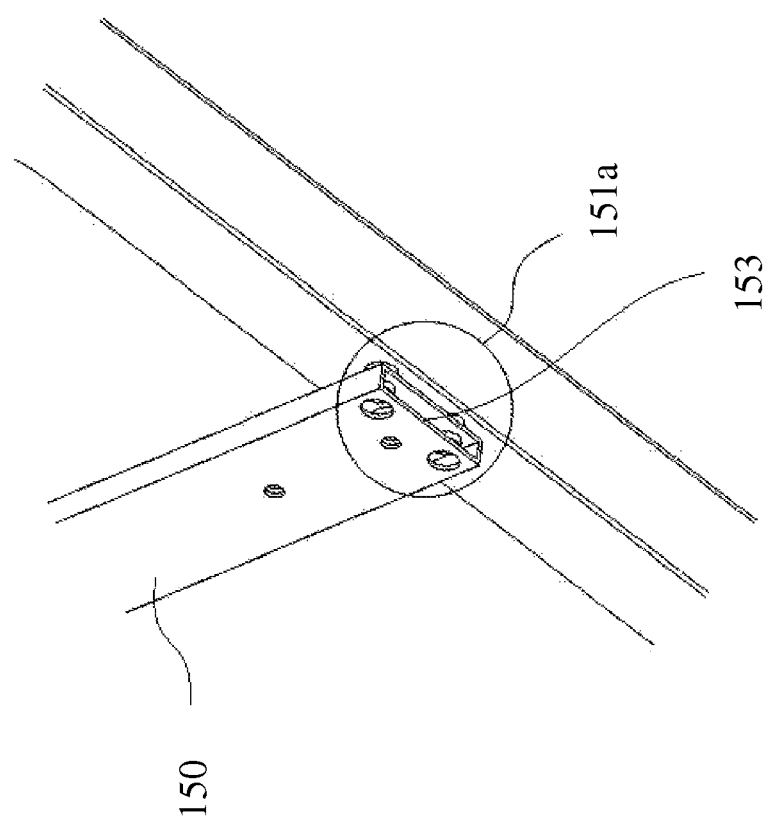
FIG. 6 is an enlarged drawing of the end 151a of the supporter 150 of FIG. 4.

Please refer to FIG. 5. FIG. 5 shows a flow chart of a method 500 for fabricating or assembling a flat panel display according to another embodiment of the present invention. The method 500 comprises step 510, step 520, step 530 and step 540. In the method 500, it should be noted that one step might be performed in series, in parallel, in combination, or otherwise in conjunction with another if the specific order is not described or inferred in the embodiment.

In step 510, a printed circuit board 130 is locked on a removable plate 129 of a rear cover 120; in step 520, a display module 140 and a front cover 110 are joined; in step 530, the front cover 110 and a main body 121 of the rear cover 120 are joined; in step 540, the removable plate 129 and the main body 121 of the rear cover 120 are assembled. Accordingly, the printed circuit board 130 is fixed on the removable plate 129 beforehand to facilitate fabrication for increasing production capacity.

The foregoing outlines features of several embodiments so that those skilled in the art may better understand the aspects of the present invention. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions and alterations herein without departing from the spirit and scope of the present invention.

What is claimed is:

1. A flat panel display, comprising:
   a front cover;
   a rear cover fixed on the front cover, wherein the rear cover has a printed circuit board region and a panel region;
   a printed circuit board locked on the rear cover and corresponding to the printed circuit board region; and
   a back plate disposed on the rear cover and corresponding to the panel region;
   a liquid crystal panel disposed between the back plate and the front cover and corresponding to the panel region, wherein the back plate is in direct contact with a backside of the liquid crystal panel, the back plate is disposed between the front cover and the rear cover, and the back plate is smaller than rear cover; and a supporter fixed on the back plate to be between the back plate and the rear cover.

2. The flat panel display of claim 1, wherein the panel region and the printed circuit board region are non-overlapping, and the back plate and the printed circuit board region are non-overlapping.

3. The flat panel display of claim 1, wherein the display module further comprises a controlling circuit board disposed on the back plate and facing the rear cover.

4. The flat panel display of claim 3, wherein the rear cover further comprises a concave disposed in the panel region for containing the controlling circuit board.

5. The flat panel display of claim 1, wherein the rear cover further comprises a notch disposed in the panel region for containing the whole of the supporter.

6. The flat panel display of claim 5, wherein the supporter has a closed cross section with the hollow structure.

7. The flat panel display of claim 1, wherein the rear cover further comprise an opening and a removable plate, wherein the opening is located in the printed circuit board region, and the removable plate corresponds to the opening.

8. The flat panel display of claim 7, wherein the edge of the removable plate and the edge of the opening are joined with each other.

9. The flat panel display of claim 7, wherein the printed circuit board is locked on the removable plate.

10. The flat panel display of claim 1, wherein the printed circuit board further comprise a plurality of the electronic component facing the back plate.

11. A flat panel display, comprise:
a front cover having a window;
a rear cover fixed on the front cover, wherein the rear cover has a panel region corresponding to the window and a printed circuit board region adjacent to the panel region;
a back plate disposed on the rear cover and corresponding to the panel region;
a liquid crystal panel disposed between the back plate and the front cover and corresponding to the panel region, wherein the back plate is in direct contact with a backside of the liquid crystal panel, the back plate is disposed between the front cover and the rear cover, and the back plate is smaller than rear cover; and
a plurality of the printed circuit boards, wherein only one of the printed circuit boards is fixed on the back plate corresponding to the display region, and the other printed circuit boards are on the rear cover and correspond to the printed circuit board region.

12. The flat panel display of claim 11, wherein the supporter has a hollow structure.

13. The flat panel display of claim 11, wherein the panel region and the printed circuit board region are non-overlapping.

14. The flat panel display of claim 11, wherein one of the printed circuit board is a controlling circuit board and is used for controlling the liquid crystal panel.

15. The flat panel display of claim 11, wherein the other printed circuit boards are the system boards and are used for providing or controlling an audio signal, a video signal, and electric power to the liquid crystal panel.

16. A flat panel display, comprising:
a front cover having a window;
a printed circuit board;
a rear cover has a main body and a removable plate, wherein the main body has a panel region corresponding to the window and a printed circuit board region, the printed circuit board region has an opening corresponding to the printed circuit board, the printed circuit board is on the removable plate, and the removable plate is disposed in the opening; and
a display module disposed between the front cover and the main body, wherein the main body and the removable plate are positioned at the same side of the display module, wherein the opening is smaller than the window and accommodates only the removable plate.

17. The flat panel display of claim 16, wherein an outer side surface of the main body and an outer side surface of the removable plate are matched.

18. The flat panel display of claim 17, wherein the printed circuit board comprises a power converter electrically connected to the display module.

19. A method for fabricating a flat panel display, comprising:
providing a front cover having a window;
providing a rear cover has a main body and a removable plate, wherein the main body has a panel region and a printed circuit board region, and the printed circuit board region has an opening;
locking a printed circuit board on the removable plate;
positioning a display module to face the window, joining the display module and the front cover; and
positioning the removable plate and the printed circuit board at the same side of the display module, and assembling the removable plate in the opening of the printed circuit board region, wherein the removable plate and the main body are coplanar;
joining the front cover and the main body.

20. A flat panel display, comprising
a front cover;
a rear cover fixed on the front cover, wherein the rear cover has a printed circuit board region and a panel region;
a plurality of system boards disposed on the rear cover and corresponding to the printed circuit board region; and
a back plate disposed on the rear cover and corresponding to the panel region; and
a liquid crystal panel disposed between the back plate and the front cover and corresponding to the panel region, wherein the system boards are used for providing or controlling an audio signal, a video signal, and electric power to the liquid crystal panel, wherein the back plate is in direct contact with a backside of the liquid crystal panel, the back plate is disposed between the front cover and the rear cover, and the back plate is smaller than rear cover.

21. The flat panel display of claim 20, wherein the display module further comprises a controlling circuit board disposed on the back plate and corresponding to the panel region.

22. The flat panel display of claim 1, wherein the display module further comprises a controlling circuit board disposed on the back plate and corresponding to the panel region.

23. The flat panel display of claim 1, wherein the back plate has an inner sidewall, wherein the supporter is surrounded by the inner side wall and is connected with the inner sidewall.

24. The flat panel display of claim 1, wherein the rear cover has a notch corresponding to the panel region, and the supporter is disposed in the notch.

25. The flat panel display of claim 11, wherein the least one of the printed circuit boards correspond to the display region is disposed on the back plate.

26. The flat panel display of claim 16, wherein the printed circuit board is between the removable plate and the display module.

27. The flat panel display of claim 16, wherein the removable plate is not overlapped with the panel region.

28. The flat panel display of claim 1, further comprising a septum disposed between the printed circuit board region and the panel region.

29. The flat panel display of claim 1, wherein the printed circuit board is in direct contact with the rear cover.

* * * * *